United States Patent
Yaegashi

[11] Patent Number: 5,919,094
[45] Date of Patent: Jul. 6, 1999

[54] PROPELLER SHAFT

[75] Inventor: Toshihiko Yaegashi, Tokyo, Japan

[73] Assignee: Matsui Universal Joint Manufacturing Company, Japan

[21] Appl. No.: 09/006,144

[22] Filed: Jan. 13, 1998

Related U.S. Application Data

[62] Division of application No. 08/402,657, Mar. 13, 1995, Pat. No. 5,771,737.

[30] Foreign Application Priority Data

| Oct. 13, 1994 | [JP] | Japan | 6-247823 |
| Oct. 13, 1994 | [JP] | Japan | 6-247824 |
| Nov. 15, 1994 | [JP] | Japan | 6-280215 |
| Nov. 21, 1994 | [JP] | Japan | 6-286239 |

[51] Int. Cl.⁶ .................................................. F16D 3/06
[52] U.S. Cl. ........................................... 464/162; 403/359
[58] Field of Search ............................ 464/162, 183, 464/181, 140, 113, 179; 403/298, 359

[56] References Cited

U.S. PATENT DOCUMENTS

| 3,367,142 | 2/1968 | Groves et al. | 464/162 |
| 4,552,544 | 11/1985 | Beckman et al. | 464/162 |
| 4,580,996 | 4/1986 | Brissette | 464/162 |
| 4,614,506 | 9/1986 | Sakata | 464/162 |
| 4,667,530 | 5/1987 | Mettler et al. | 464/162 |
| 5,064,040 | 11/1991 | Johnson | 403/359 |
| 5,645,366 | 7/1997 | Ishibashi et al. | 403/359 |
| 5,697,850 | 12/1997 | Yaegashi et al. | 464/162 |

*Primary Examiner*—Eileen D. Lillis
*Attorney, Agent, or Firm*—Silverman, Cass & Singer, Ltd.

[57] ABSTRACT

A propeller shaft includes male and female shafts, each having at one end a yoke and at the other end a spline sliding portion. At least one of these shafts is wholly made of a hollow tube and its one end is worked to form an integral yoke and the other end is plastically worked with a die to form an integral spline sliding portion. A separate yoke may be welded to the hollow tube. The spline sliding portion thus formed has spline teeth of an integer number within the range of numerals obtained by multiplying the numeral indicating a larger spline diameter in mm by 0.12 to 0.25. The spline teeth has a spline tooth root angle within the range of 90 to 120 degrees enclosed between side faces of adjacent spline teeth. The propeller shaft reduces man-hour for producing it to improve the production efficiency and hence reduce its cost. The plastically worked integral spline sliding portion eliminates the misalignment of parts of the propeller shaft and does not have any residual stress resulting from welding operation.

10 Claims, 17 Drawing Sheets

FIG_2a PRIOR ART
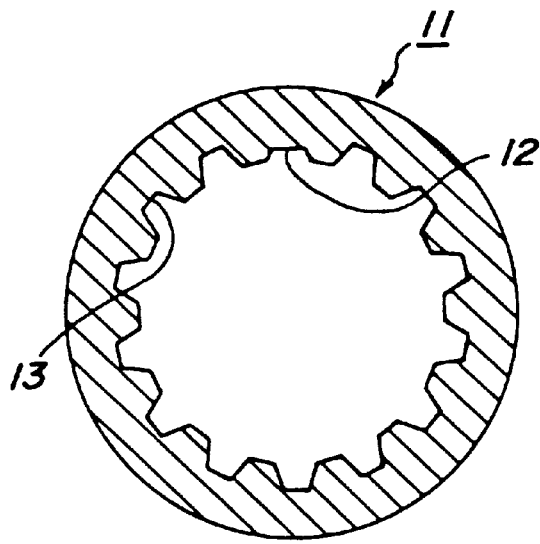
FIG_2b PRIOR ART
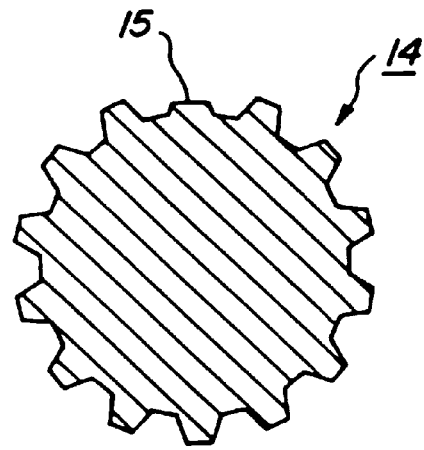
FIG_3a PRIOR ART
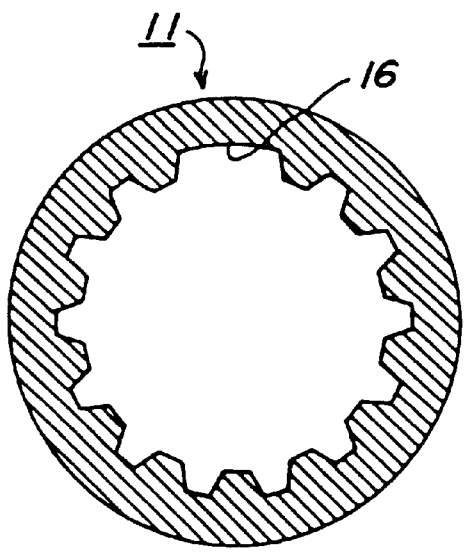
FIG_3b PRIOR ART
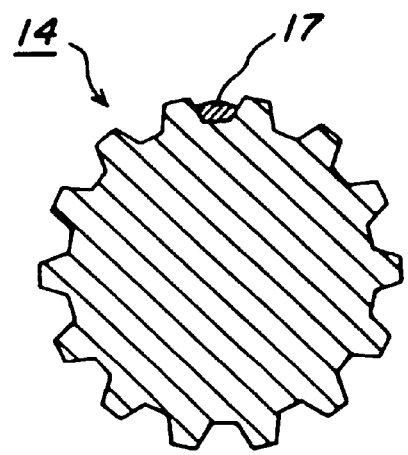

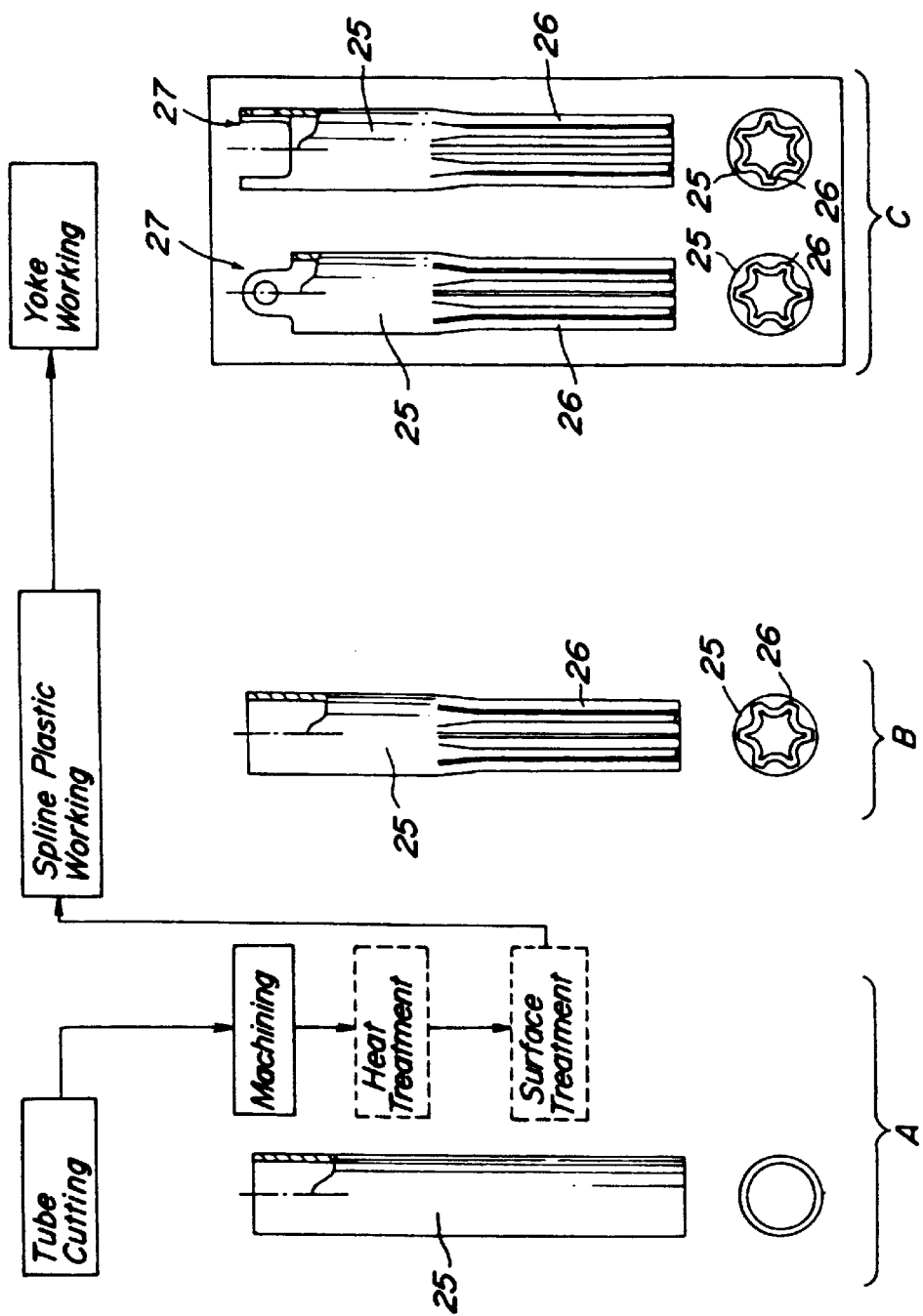

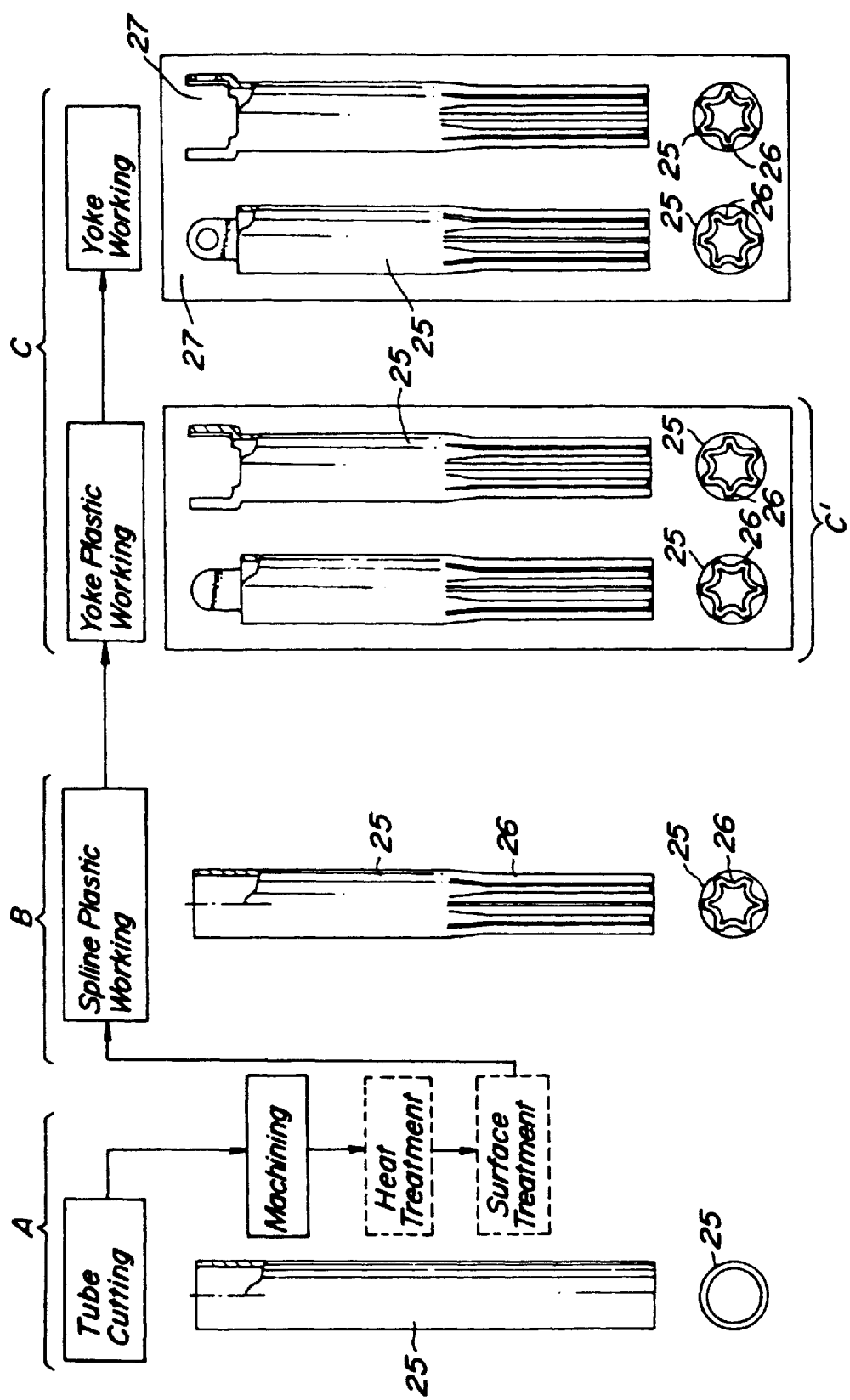

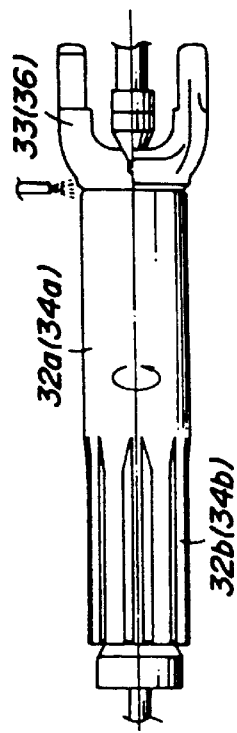
FIG_9d
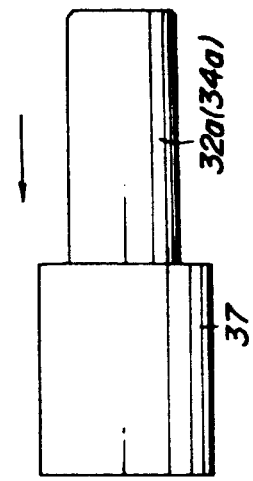
FIG_9e
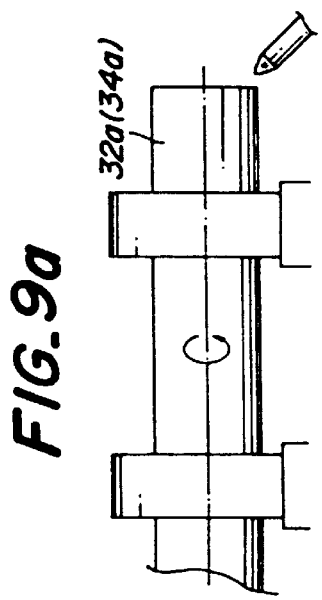
FIG_9a
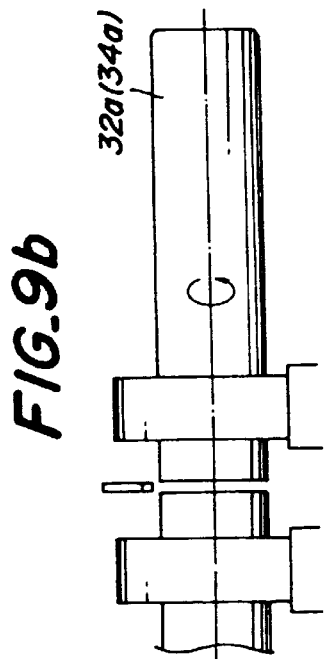
FIG_9b
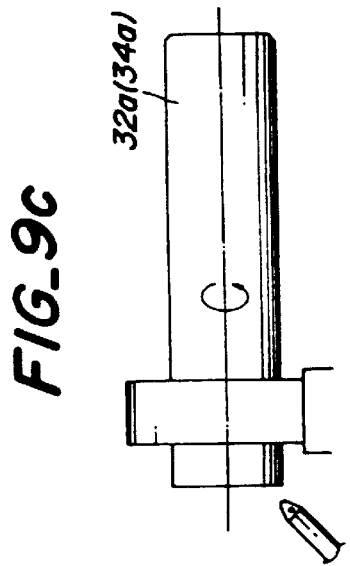
FIG_9c

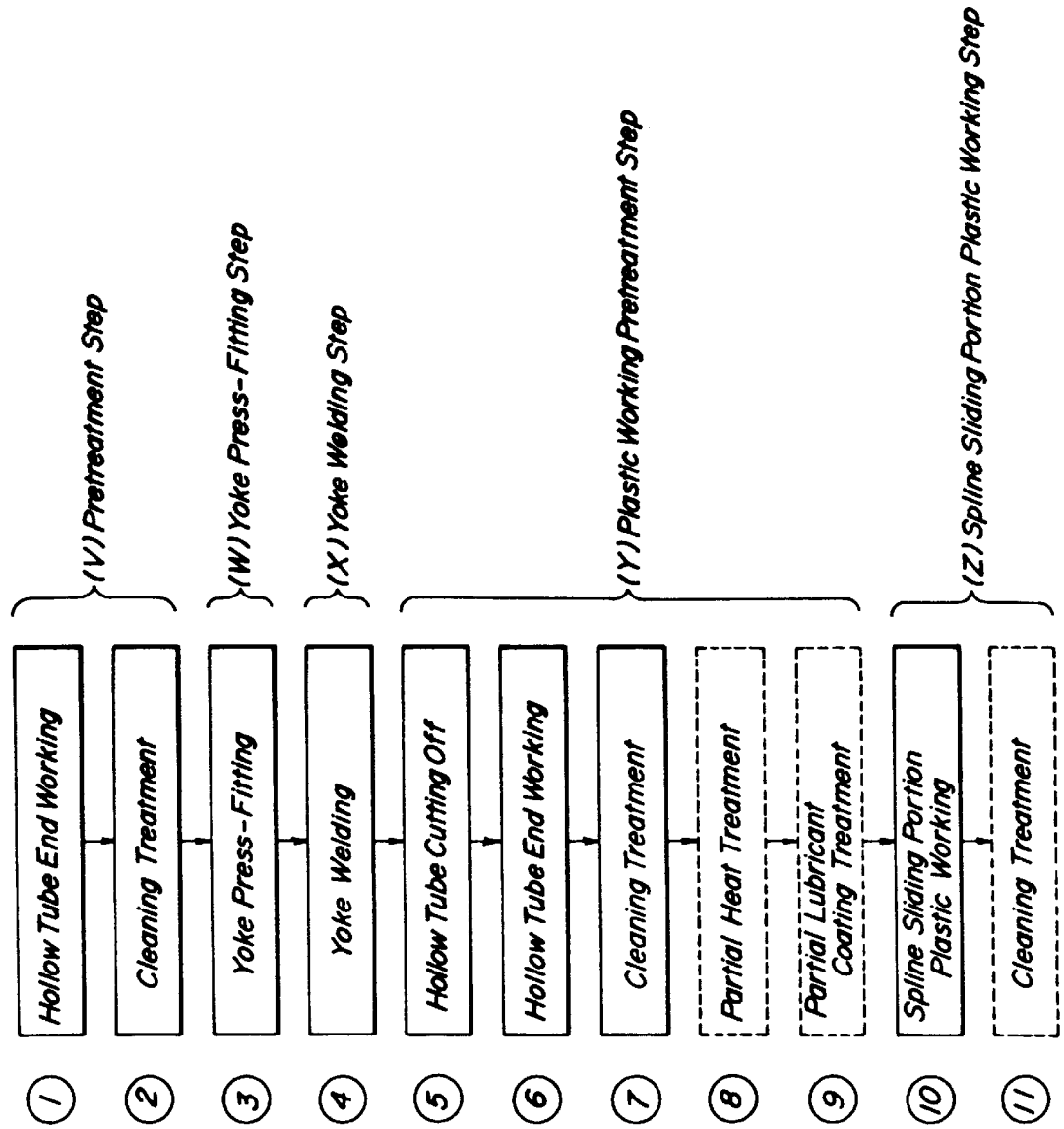

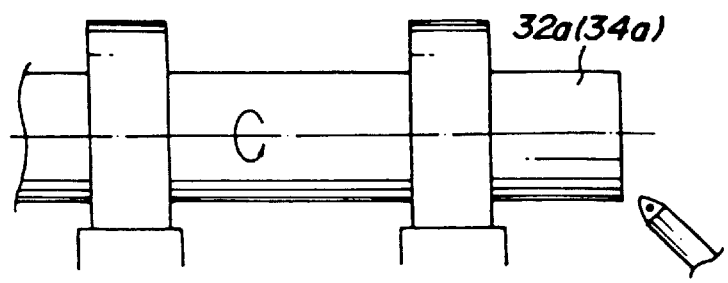
FIG_11a
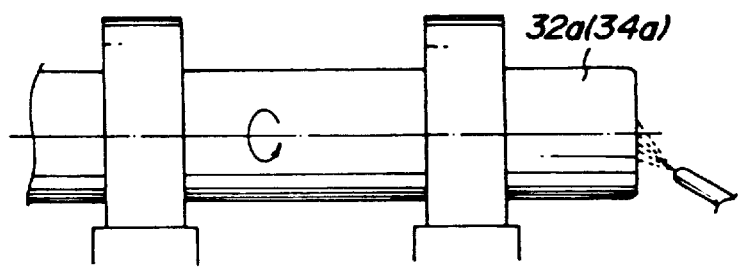
FIG_11b
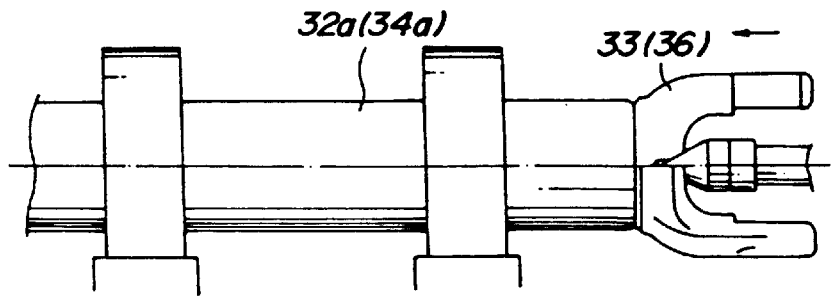
FIG_11c
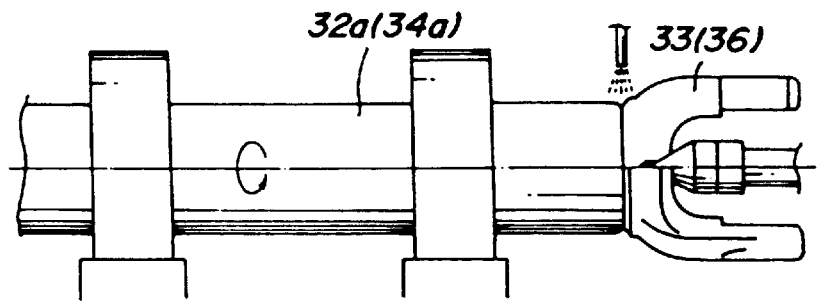
FIG_11d

FIG_13a
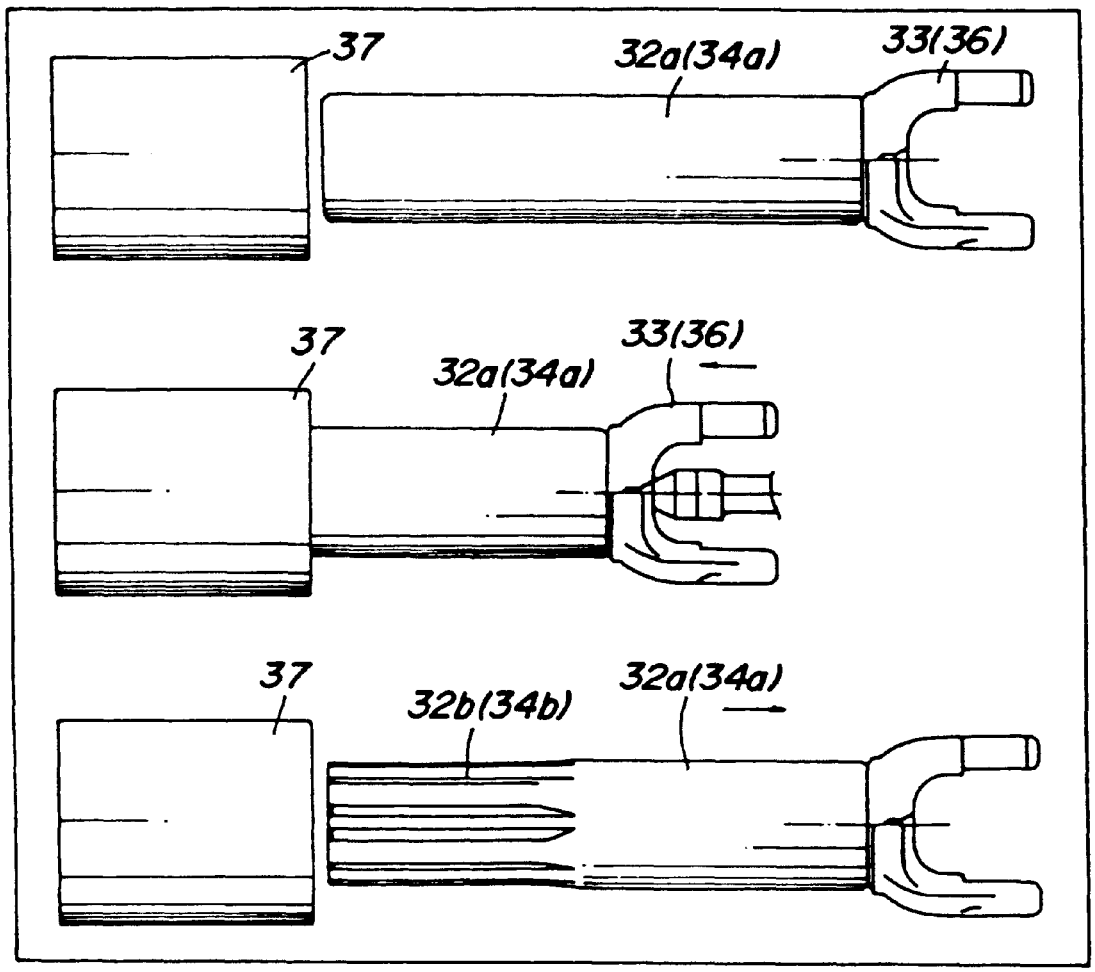
FIG_13b
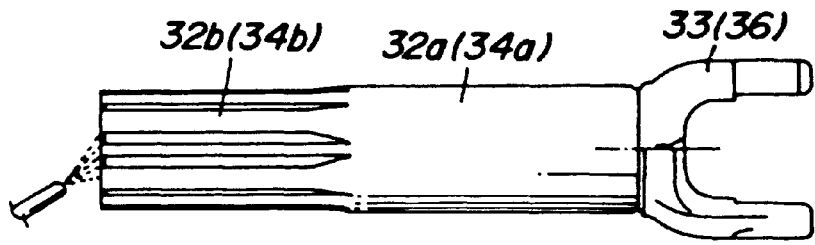

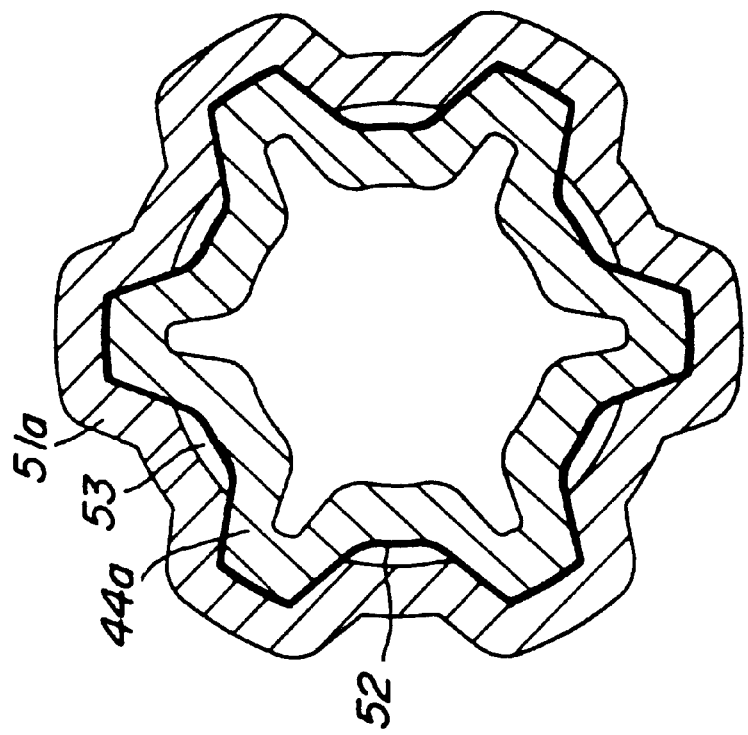
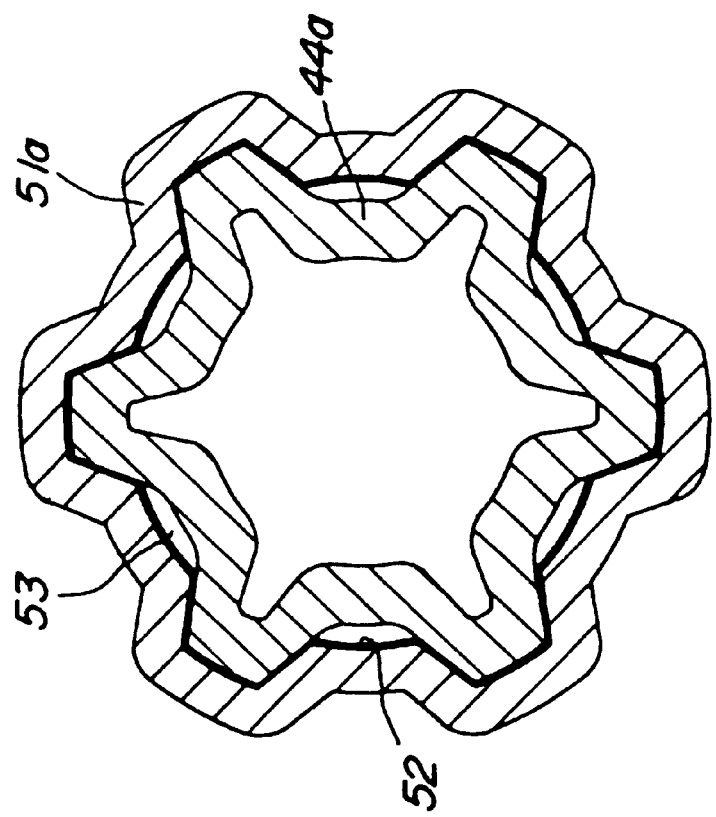

FIG_17a
FIG_17b
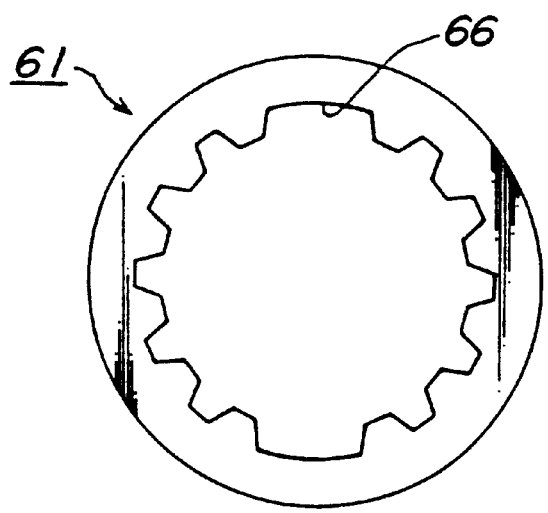
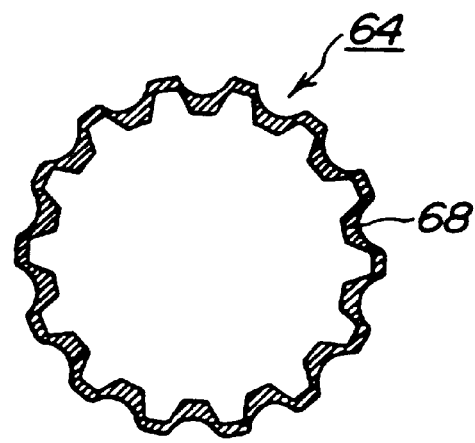

FIG_18a
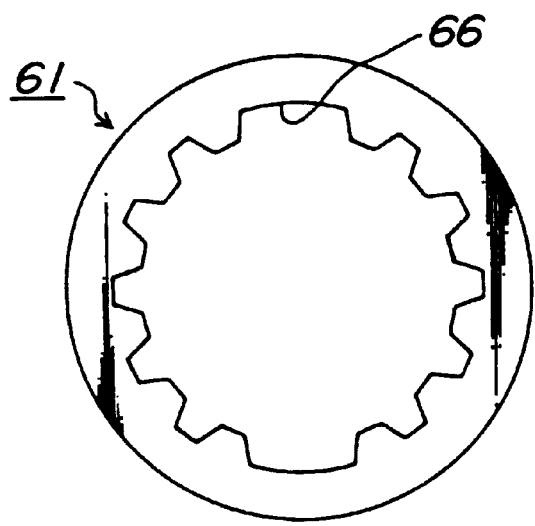
FIG_18b
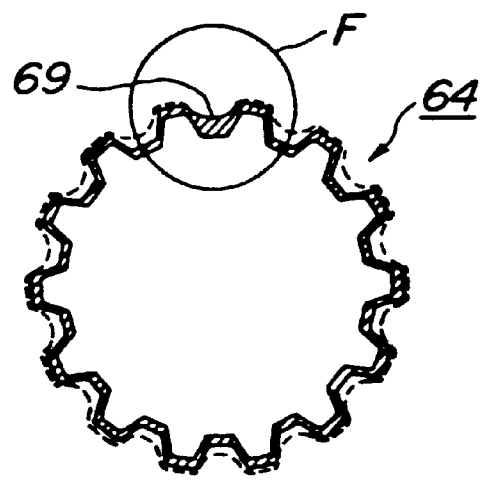
FIG_19
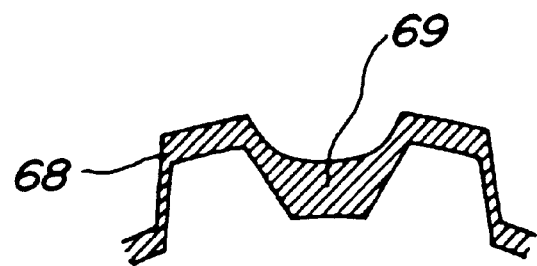

PROPELLER SHAFT

This is a divisional of application Ser. No. 08/402,657, filed Mar. 13, 1995, now U.S. Pat. No. 5,771,737.

BACKGROUND OF THE INVENTION

This invention relates to a propeller shaft having male and female shafts, each having at one end a yoke and at the other end a spline sliding portion to be fitted with each other and a method for producing such a propeller shaft. More particularly, the invention relates to a method for forming a phase indexing reference of spline shafts including steps of forming an irregular portion on part of spline teeth of a regular female spline tooth pattern of a female shaft, and forming an irregular portion on part of spline teeth of a regular male spline tooth pattern of a male shaft, these irregular portions being able to be fitted with each other when the male and female shafts coincide in phase of spline teeth with each other.

In producing such a propeller shaft in the past, a hollow tube has been generally cut into a required length for the shaft as shown in FIG. 1a, and a spline toothed member 2 and a yoke 3 have been brought into engagement with respective associated ends of the cut hollow shaft 1 and connected thereto as by welding as shown in FIG. 1b. A solid bar member has been generally worked by rolling or tooth cutting or hobbing to form a spline toothed member 2 for a male shaft, or by broaching to form a spline toothed member 2 for a female shaft.

In such a hitherto used producing method, it was needed to press-fit the spline toothed member 2 and the yoke 3 into the respective ends of the length adjusting hollow tube 1 and then to join them at joint positions 4 by electric welding or friction welding. Therefore it took much time for producing the propeller shaft, and after thus joined, the accuracy of the shaft as a whole often became insufficient, even with each high individual accuracy of the respective element members 1, 2 and 3.

In more detail, these element members 1, 2 and 3 are not machined by the same apparatus, but are produced in exclusive apparatuses or areas, respectively, causing much economical losses.

Moreover, as the produced propeller shaft is a combined body made of the separate members 1, 2 and 3, there is a tendency for the propeller shaft to be joined in an incorrect condition, with angular displacement in phase, eccentricity, bend or curve, and the like, with the result that uneven rotation and unbalance may be caused to reduce the durability of the propeller shaft and generate strange sound and vibration in operation. As a result, an amending operation for the produced propeller shaft is needed in order to improve its accuracy to a required level.

Furthermore, the male shaft is worked to form its spline by rolling, tooth cutting, or broaching so that chips are produced to cause losses of material, reduction in strength and environmental pollution. Moreover, these working operations may in general obstruct the production of a light-weight propeller shaft, and the solid male shaft of a propeller shaft increases its weight.

In assembling spline shafts, in general, after yokes of male and female shafts are brought into angular coincidence with each other, the spline toothed portions of the male and female shafts are slidably connected to each other. Due to the multiplicity of the spline teeth, however, there is a risk of spline shafts being assembled with displaced angular phase without careful operation for bringing the male and female shaft in angular coincidence in angular phase with each other. If there is such a displacement in phase, the difference in phase between input and output sides causes changes in rotation and torque and hence causes noise and vibration, resulting into reduction of service life.

There have been various methods for forming phase indexing references for spline shafts in order to facilitate the assembling of them as shown in FIGS. 2a, 2b, 3a, 3b, 4a and 4b.

In FIGS. 2a and 2b, spline teeth of a female shaft 11 are formed to have an irregular portion 12 at one bottom between adjacent two spline teeth of a regular pattern of the female shaft 11. The irregular portion 12 is a shallower bottom than the other bottoms 13 between the other spline teeth. On the other hand, spline teeth of a male shaft 14 are formed to have an irregular portion 15 at one of spline teeth of a regular pattern of the male shaft 14. The irregular portion 15 is a lower tooth adapted to be fitted in the irregular portion 12 of the female shaft 11 when the male and female shafts coincide in phase with each other. The irregular portion 15 of the male shaft 14 corresponds to the "phase indexing reference". In this case, the spline of the female shaft is finished by broaching, while the spline of the male shaft is finished by milling.

In FIGS. 3a and 3b, spline teeth of a female shaft 11 are formed to have an irregular portion 16 at one tooth of a regular pattern of a female shaft 11. The irregular portion 16 has a form in which one tooth is removed to connect or merge two bottoms on both sides of the removed tooth into a widened bottom as an irregular portion 16. Two diametrically opposed irregular portions 16 may be provided as in another example shown in FIG. 4a and 4b. These spline teeth of particular patterns are finished by broaching. As shown in FIGS. 3b and 4b, a filling 17 as an irregular portion is provided in the bottom between two spline teeth of an irregular pattern of a male shaft 14 corresponding to the irregular portion 16 of the female shaft 11. The filling 17 is formed by spot welding so as to have a height not higher than that of the other spline teeth of the male shaft 14.

With the method shown in FIGS. 2a and 2b, it is difficult to work only one spline tooth of the male shaft 14 by tooth cutting to form the irregular portion. Moreover, with the method shown in FIGS. 3b and 4b, the filling 17 tends to fall off in use.

SUMMARY OF THE INVENTION

It is a first object of the invention to provide a propeller shaft which is able to be produced with fewer working steps for a shorter period of time and hence which is inexpensive to manufacture, higher in accuracy, lighter in weight and hence economically advantageous and superior in balance of strength.

It is another object of the invention to provide a method for producing such a favorable propeller shaft mentioned in the above first object of the invention.

It is a further object of the invention to provide a method for forming a phase indexing reference of spline shafts whose irregular portion is easily formed and there is no risk of the irregular portion falling off.

In order to accomplish the above objects, in the propeller shaft according to the invention, at least one of said male and female shafts is wholly made of a hollow tube, and its yoke is an integral part of said hollow tube which has been worked to form it and its spline sliding portion is another integral part of said hollow tube which has been plastically worked to form it.

The yoke may be formed as a separate part and press-fitted into one end of the hollow tube and welded thereat.

In a preferred embodiment of the invention, the spline sliding portion of each of the male and female shafts has spline teeth whose number is an integer within the range of numerals obtained by multiplying the numeral indicating a larger spline diameter D in mm by 0.12 to 0.25. Moreover, the spline teeth have a spline tooth root angle within the range of 90 to 120 degrees enclosed between side faces of adjacent spline teeth.

In another aspect of the invention, the method for producing a propeller shaft according to the invention comprises a plastic working pretreatment step for making a hollow tube for said male or female shaft into a predetermined length and pretreating it; a spline sliding portion plastic working step for forming a spline sliding portion at said one end with a press-die; and a yoke providing step for providing a yoke on said other end of said hollow tube opposite to said spline sliding portion, any one of said last mentioned two steps being carried out prior to the other.

In the plastic working pretreatment step preferably comprises steps of cutting the hollow tube into the predetermined length for producing the male or female shaft; working one end of the hollow tube for finishing it; and cleaning the hollow tube. The plastic working pretreatment step preferably further comprises steps of heat treating the cleaned hollow tube to obtain its refined metal structure; and coating a surface-active agent at least on the spline sliding portion of the tube preparatory to its plastic working.

Moreover, the method for producing a propeller shaft according to the invention comprises a pretreatment step for one end of a hollow tube for said male or female shaft; thereafter a yoke providing step for providing a yoke on one end of said hollow tube; a plastic working pretreatment step for making the other end of said hollow tube into a predetermined length and pretreating it; and a spline sliding portion plastic working step with a press-die for forming said spline sliding portion.

The yoke providing step comprises a step of working the other end of the hollow tube to form said yoke thereat. This end of the hollow tube is preferably worked by cutting with laser or plasma. The yoke providing step may include a widening plastic working step for working the yoke to move its arms diametrically outwardly away from each other.

As an alternative, in the yoke providing step, a separate yoke may be press-fitted into the one end of the hollow tube and welded thereto.

According to the invention, a hollow tube, which has been used only for adjusting the length of the shaft of the prior art, is formed at one end with a spline sliding portion and is provided at the other end with a yoke by directly working the hollow tube or press-fitted and welded. Therefore, there is no need for complicated workings such as rolling, tooth cutting, broaching, and the like and welding operation (little, if any) for producing the propeller shaft, so that any amending operation after assembled is not required, thereby improving the production efficiency, reducing the production cost, and eliminating environmental pollution, and providing a lightweight propeller shaft.

According to one embodiment of the invention, in the spline sliding portion plastic working step, the press-die having a forming profile which is able to form spline teeth having an integer number within the range of the numerals obtained by multiplying the numeral indicating a larger spline diameter D in mm by about 0.12 to 0.25.

According to a further preferable embodiment of the invention, in said spline sliding portion plastic working step, the press-die has a forming profile which is able to form equally circumferentially spaced spline teeth having an integer number within the range of the numerals obtained by multiplying the numeral indicating a larger spline diameter D in mm by about 0.12 to 0.25 and said spline teeth having a spline tooth root angle within the range of 90 to 120 degrees enclosed between side faces of adjacent spline teeth.

According to the invention, the spline sliding portions of the propeller shaft have the spline teeth having an integer number within the range of the numerals obtained by multiplying the numeral indicating a larger spline diameter D in mm by about 0.12 to 0.25 and the spline teeth having a spline tooth root angle within the range of 90 to 120 degrees enclosed between side faces of adjacent spline teeth. Therefore, the number of the spline teeth is much fewer than those of the prior art spline shafts and hence the splines are easily press-formed in conjunction with the advantageous spline tooth root angle.

Moreover, the press-forming die has inward projections extending inwardly of its cavity with wide angles such as 90 to 120 degrees corresponding to the spline tooth root angles. Therefore, the strength of the die is increased to improve its durability and to prolong its service life. Furthermore, spline teeth are spaced circumferentially substantially equidistant one relative to the other so that no unbalance in weight occurs and therefore stability in rotation is improved.

In a preferred embodiment, the press-die has a forming profile which is able to form spline teeth having a larger diameter smaller than the inner diameter of said hollow tube. As a result, the plastically deformed spline sliding portion has been compressed and its metallurgical structure becomes denser to increase its mechanical strength. With this arrangement, moreover, it becomes possible to insert the spline sliding portion of the male shaft into the female hollow tube beyond the spline sliding portion of the female shaft, thereby enabling the sliding stroke of the male shaft to be longer.

Preferably, the method further comprises a step of coating a plastic film on at least one of the spline sliding portions of the male and female shafts.

In a further aspect, in a method for forming a phase indexing reference of spline shafts, including steps of forming an irregular portion on part of spline teeth of a regular spline tooth pattern of a female shaft, and forming an irregular portion on part of a regular spline tooth pattern of a male shaft, said irregular portion of the male shaft being able to be fitted in said irregular portion of said female shaft when said male shaft coincides in phase of spline teeth with said female shaft, according to the invention the method comprises steps of forming the spline teeth of said female shaft to have at least at one position an irregular portion having a form in which one spline tooth is removed to connect two bottoms on both sides of said removed tooth to obtain a widened bottom as said irregular portion for the female shaft; coating a plastic film somewhat thick wholly on spline teeth of said male shaft; and reforming said plastic film into a shape corresponding to the spline shape of said male shaft except for part of the plastic film on one bottom between two adjacent spline teeth of said male shaft corresponding to said widened spline tooth bottom of said female shaft in coincidence in phase with said male shaft.

According to the invention, the irregular portion as the phase indexing reference on the male shaft can be provided by mechanically working (for example, broaching) a plastic film. Therefore, the phase indexing reference can be very easily provided.

The invention will be more fully understood by referring to the following detailed specification and claims taken in connection with the appended drawings.

BRIEF DESCRIPTION OF THE DRAWINGS

FIG. 2a is a sectional view illustrating a female shaft having an irregular portion as a first example of the phase indexing reference of the prior art;

FIG. 2b is a sectional view illustrating a male shaft mating with the female shaft shown in FIG. 2a, having an irregular portion as a phase indexing reference;

FIG. 3a is a sectional view illustrating a female shaft having an irregular portion as another example of the phase indexing reference of the prior art;

FIG. 3b is a sectional view illustrating a male shaft mating with the female shaft shown in FIG. 3a, having an irregular portion as a phase indexing reference of the prior art;

FIG. 5 is a flow sheet showing steps for producing a propeller shaft according to a first embodiment of the invention;

FIG. 6 is a flow sheet showing steps for producing a propeller shaft according to a second embodiment of the invention;

FIGS. 9a to 9e are schematic views for explaining working operations according to the flow sheet shown In FIG. 8;

FIG. 10 is a flow sheet showing steps for producing a propeller shaft according to a fourth embodiment of the invention;

FIGS. 11a to 11d are schematic views for explaining the working operations in the first stage of the flow sheet shown in FIG. 10;

FIGS. 13a and 13b are schematic views for explaining the working operations in the last stage of the flow sheet shown in FIG. 10;

FIG. 15b is a sectional view taken along the line XVb—XVb in FIG. 15a;

FIGS. 16a and 16b are sectional views illustrating fitted conditions of the spline sliding portions of male and female shafts of a propeller shaft according to the invention;

FIG. 17a is a sectional view illustrating a female shaft having an irregular portion as the phase indexing reference according to the invention;

FIG. 17b is a sectional view illustrating a male shaft mating with the female shaft shown in FIG. 17a, having a plastic film coated on the spline sliding portion of the male shaft according to the invention;

FIG. 18a is a sectional view illustrating a female shaft having an irregular portion as the phase indexing reference according to a modified embodiment of the invention;

FIG. 18b is a sectional view illustrating the male shaft shown in FIG. 17b, whose plastic film has been reformed into a shape corresponding to the spline sliding portion of the male shaft except for part of the plastic film on one bottom between two adjacent spline teeth of the male shaft; and FIG. 19 is a partial sectional view illustrating on an enlarged scale the part marked in a circle F shown in FIG. 18b.

DESCRIPTION OF THE PREFERRED EMBODIMENTS

Figure 1A:
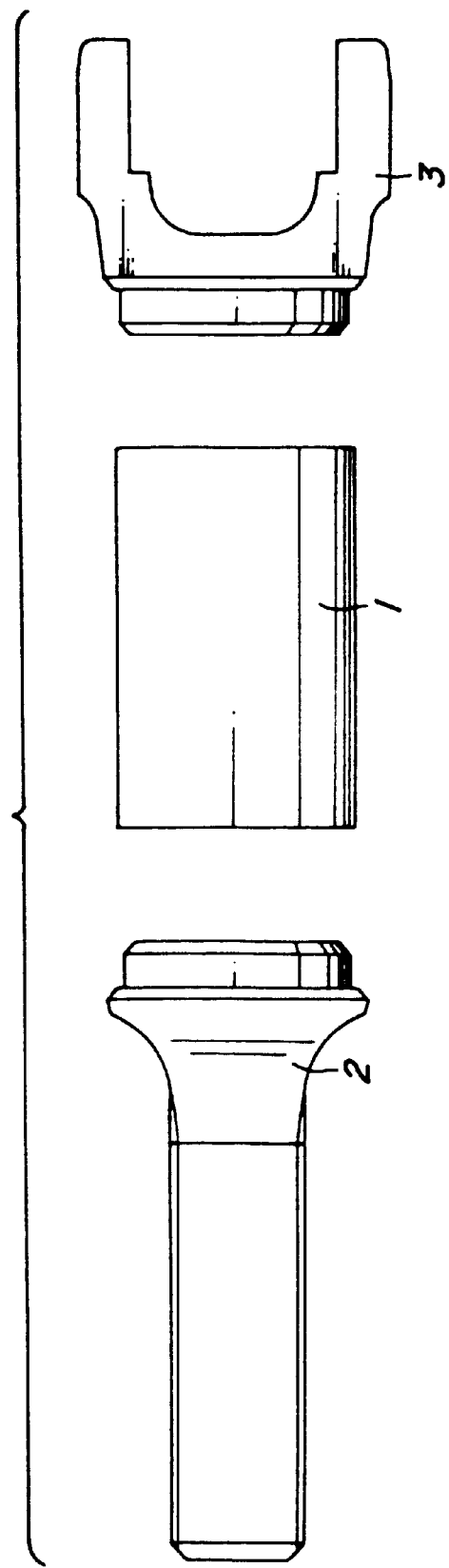
FIG. 1a is an explanatory view illustrating a method for producing a propeller shaft of the prior art before assembling its three parts.
Figure 1B:
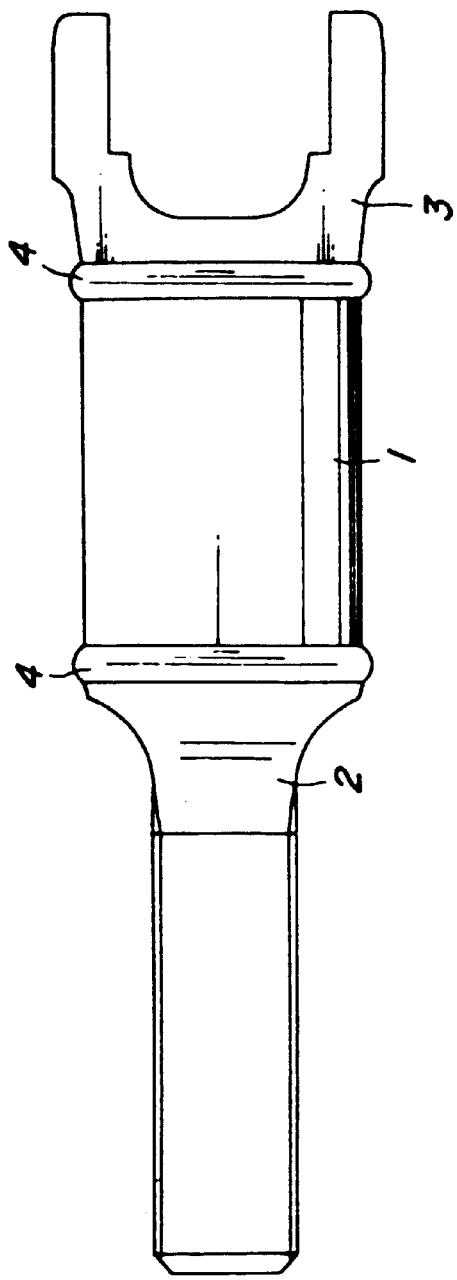
FIG. 1b is an explanatory view illustrating the method of FIG. 1a after assembled three parts.

FIG. 5 illustrates a flow sheet of steps for the first embodiment of the method for producing the propeller shaft according to the invention. The steps of the first embodiment consist of a plastic working pretreatment step A, a spline sliding portion plastic working step B, and a yoke working step C. The "plastic working" used herein means a working of a hollow tube causing its plastic deformation.

The plastic working pretreatment step A is carried out, for example, in the following manner as shown in FIG. 5.

1) A step of cutting a thick hollow tube 25 having required strength and durability into a predetermined length.
2) A step of working the cut end of the hollow tube 25.
3) A heat treatment step performed if required.
4) A surface treatment step performed if required.

In the spline sliding portion plastic working step B, one end of the predetermined length hollow tube 25 obtained by the treatment in the plastic working pretreatment step A is inserted into a press-die (not shown in FIG. 5) and then plastically worked to form the spline sliding portion 26.

In the yoke working step C, the other end of the hollow tube 25 opposite to the spline sliding portion is worked, for example, by machining, preferably by cutting with laser or plasma into the form of a yoke 27. The yoke working step C may be carried out before the spline sliding portion plastic working step B.

FIG. 6 illustrates a flow sheet of steps of the second embodiment of the method for producing the propeller shaft according to the invention. In the second embodiment, the yoke working step C includes a widening plastic working step C' for working the yoke to move the yoke's arms diametrically outwardly away from each other as shown in C' in FIG. 6.

In contrast with the prior art of the propeller shaft having been made from three members, the method according to the invention produces the propeller shaft from only a single member as described above. Therefore, the propeller shaft according to the invention precludes any deviation in phase between the spline sliding portion 26 and the yoke 27 to eliminate malfunctioning due to difference in phase occurring in propeller shafts of the prior art.

The method of the invention for producing the propeller shaft completely eliminates the welding operation for connecting parts so that no bending due to welding occurs in the shaft and balance performance of the shaft is improved without any amendment working process, thereby providing a propeller shaft suitable for high speed rotation.

Moreover, since a tube is used as a blank material for the propeller shaft, a light-weight propeller shaft can be provided, which greatly serves to improve its GD2 value (moment of inertia) and hence fuel cost for a vehicle equipped with the propeller shaft. Furthermore, the method of the invention reduces man-hour for producing the shaft to improve the production efficiency, thereby greatly reducing the manufacturing cost. In producing the propeller shaft according to the method of the invention, the yield or productivity of materials is so high to contribute to saving resources.

Moreover, a required overall length of the propeller shaft and a required length of the spline sliding portion are readily obtained by adjusting the length of tube to be cut and by adjusting the extruding stroke in the plastic working to meet the respective requirements.

Figure 7A:
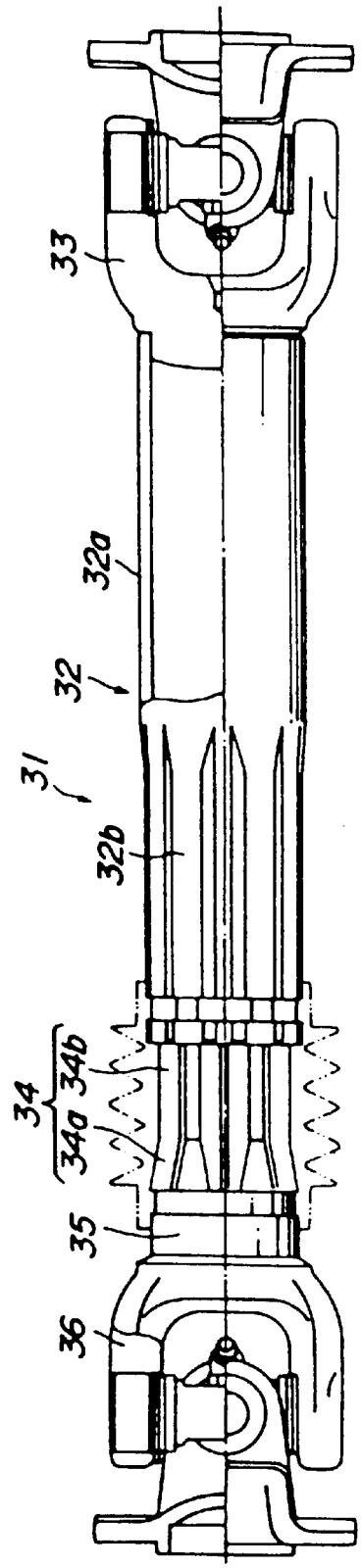
FIG. 7a is a view illustrating a propeller shaft made of a hollow tube according to the invention.

FIG. 7a illustrates the propeller shaft 31 according to one embodiment of the invention. In this embodiment, the female shaft 32 is mainly made of a hollow tube 32a whose one end has a yoke 33 directly press-fitted into the one end and welded thereat and whose other end is formed with a spline sliding portion 32b. On the other hand, the male shaft 34 is partially made of a hollow tube 34a on which a spline sliding portion 34b is formed, and a yoke 36 is secured through a connecting shaft 35 to the male shaft 34.

Figure 7B:
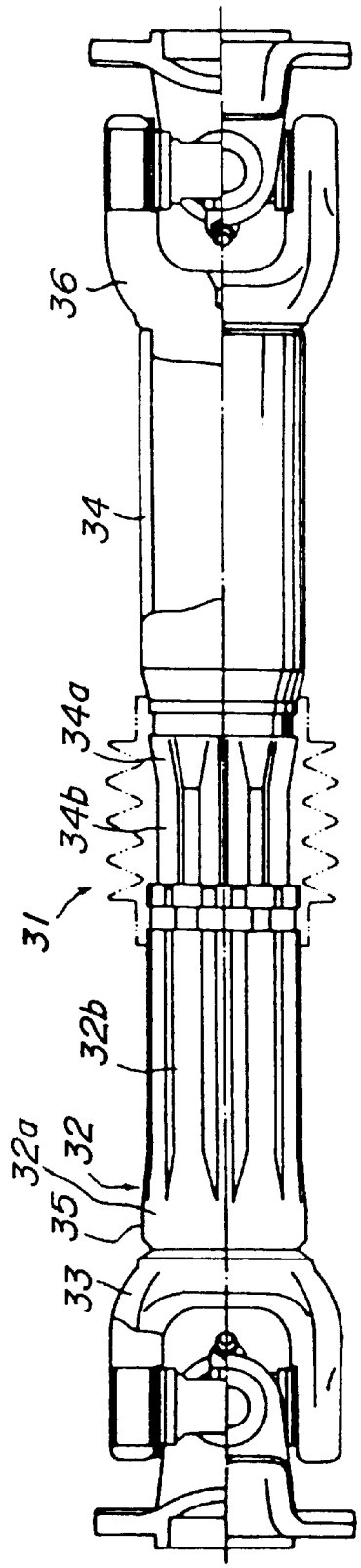
FIG. 7b is a view illustrating another propeller shaft made of a hollow tube according to the invention.

FIG. 7b illustrates another embodiment related to that shown in FIG. 7a and which carries the same reference numerals. In this modified embodiment, the male shaft 34 is mainly made of a hollow tube 34a whose one end has a yoke 36 directly press-fitted into the one end and welded thereat and whose other end is formed with a spline sliding portion 34b. On the other hand, the female shaft 32 is partially made of a hollow tube 32a on which a spline sliding portion 32b is formed, and a yoke 33 is secured through a connecting shaft 35 to the female shaft 32.

According to the method for producing a propeller shaft, a female or male shaft 32 or 34 is mainly made of a hollow tube 32a or 34a, whose one end is formed with a spline sliding portion 32b or 34b by press-forming and whose other end is provided with a yoke directly press-fitted therein and welded thereat.

Figure 8:
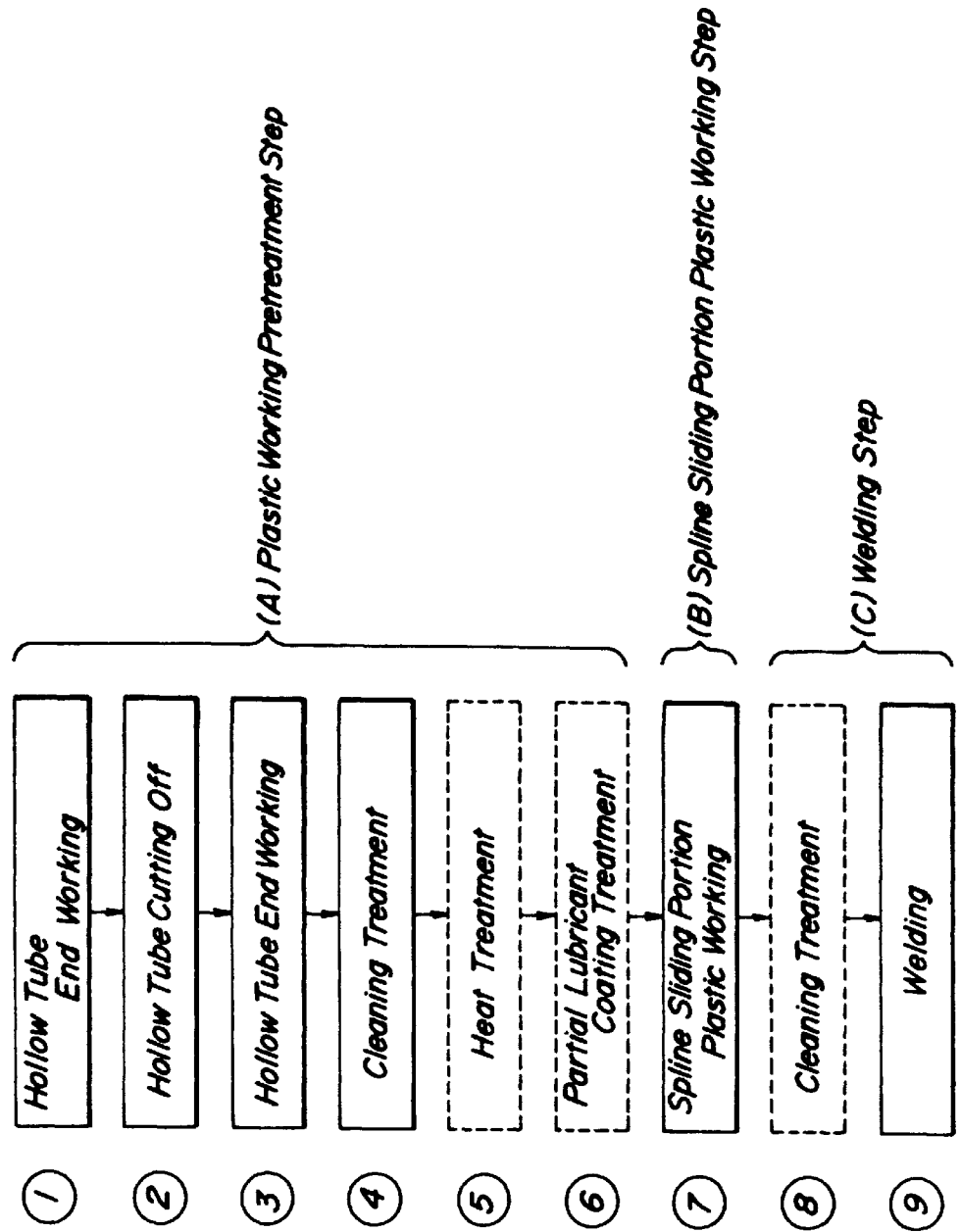
FIG. 8 is a flow sheet showing steps for producing a propeller shaft according to a third embodiment of the invention.

FIG. 8 shows a flow sheet of the steps according to the third embodiment of the invention. The steps of the third embodiment consist of a plastic working pretreatment step A, a spline sliding portion plastic working step B, and a welding step C.

The plastic working pretreatment step A is carried out, for example, in the following manner.

1) A step of working the end of a hollow tube 32a or 34a as shown in FIG. 9a in order to assure the accuracy or to remove burrs created in cutting off.
2) A step of cutting the hollow tube 32a or 34a into a predetermined length as shown in FIG. 9b.
3) A step of working the cut end of the hollow tube 32a or 34a as shown in FIG. 9c.
4) A step of cleaning of the hollow tube 32a or 34a for removing chips and oily matters from it.

If required, the following steps may be preferably added.

5) A heat treatment step of normalizing or annealing of the hollow tube in order to obtain a refined metallurgical structure of the hollow tube.

6) A partial lubricant coating treatment step for coating a metallic soap (lubricant) or surface-active agent required for the plastic working of the tube, at least spline sliding portion of the hollow tube 32a or 34a.

In the spline sliding portion plastic working step B, the predetermined length hollow tube 32a or 34a obtained by the treatments in the plastic working pretreatment steps A is inserted into a press-die 37 and then plastically worked. The press-die 37 is so constructed to form splines of a shaft having the number of spline teeth which is an integer within the range of the numerals obtained by multiplying the numeral indicating the larger spline diameter D in mm by 0.12 to 0.25. For example, if the larger spline diameter is 50 mm, the number of spline teeth (the number of spaces between teeth) is 6 (six) to 12 (twelve).

The welding step C is carried out (FIG. 8) in the following manner.

8) A step of cleaning of the hollow tube 32a or 34a for removing remaining coating or metallic soap (or oily matters) or scales, if required.
9) A step of press-fitting a yoke 33 or 36 into the end of the hollow tube opposite to the spline sliding portion 32b or 34b and welding the yoke thereat.

FIG. 10 shows a flow sheet of the steps according to the fourth embodiment of the invention. The steps of the fourth embodiment consist of a pretreatment step V for one end of a hollow tube for a male or female shaft, a yoke press-fitting step W, a yoke welding step X, a plastic working pretreatment step Y for trimming or cutting the opposite end of the hollow tube into a predetermined length and conditioning it, and a spline sliding portion plastic working step Z.

The pretreatment step V is carried out, for example, in the following manner.

1) A step of working the end of a hollow tube 32a or 34a as shown in FIG. 11a.
2) A step of cleaning the hollow tube 32a or 34a as shown in FIG. 11b.
3) A yoke press-fitting step W for press-fitting a yoke 33 or 36 into the one end of the hollow tube 32a or 34a as shown in FIG. 11c, after the pretreatment step V.
4) A yoke welding step X for welding the yoke press-fitted portion at the one end of the hollow tube 32a or 34a as shown in FIG. 11d, after the yoke press-fitting step W.

Thereafter, the plastic working pretreatment step Y is carried out for trimming or cutting the opposite end of the hollow tube into a predetermined length and conditioning it in the following manner.

Figure 12A:
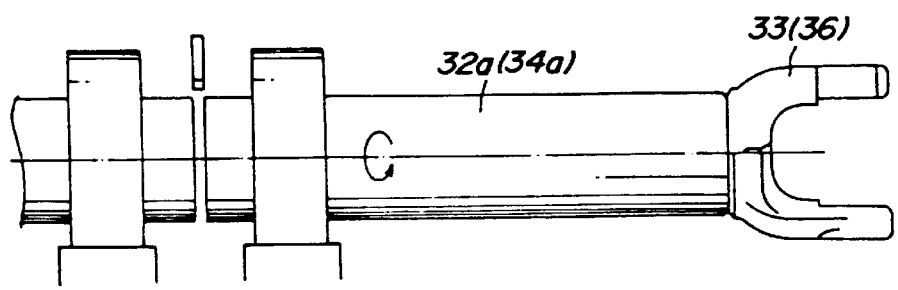
FIGS. 12a to 12c are schematic views for explaining the working operations in the middle stage of the flow sheet shown in FIG. 10.
Figure 12B:
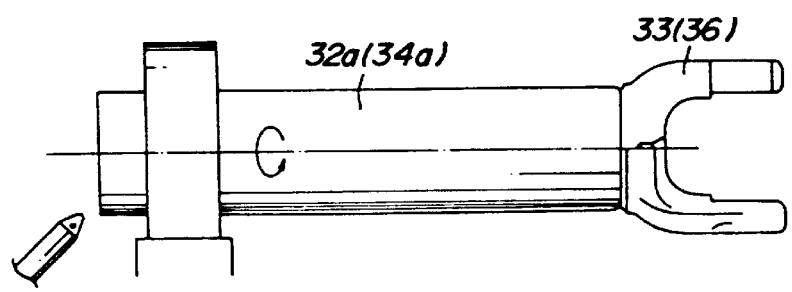
Figure 12C:
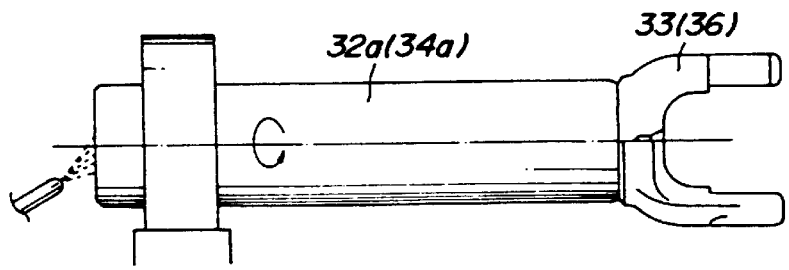

5) A step of cutting off the end of the hollow tube 32a or 34a opposite to the yoke into a predetermined length as shown in FIG. 12a.
6) A step of working the cut end of the hollow tube as shown in FIG. 12b.
7) A step of cleaning the cut end of the hollow tube as shown in FIG. 12c.

If required, the following steps may be added in the same manner in the third embodiment explained in connection with FIG. 8.

8) A partial heat treatment step.
9) A partial lubricant coating treatment step.

After the plastic working pretreatment step Y, the spline sliding portion plastic working step Z is carried out in the following two steps, wherein the end of the hollow tube 32a or 34a opposite to the yoke 33 or 36 is press-formed (plastically deformed) by a press-die 37 to form a spline sliding portion 32b or 34b having the number of spline teeth which is an integer within the range of the numerals obtained by multiplying the numeral indicating the larger diameter D in mm by 0.12 to 0.25 (FIG. 13a), and the spline sliding portion 32b or 34b plastically worked is then cleaned (FIG. 13b).

While a separate yoke 33 or 36 is press-fitted into the hollow tube and welded thereto in the third and fourth embodiments, it will be apparent that a yoke may be integrally formed at that end of the hollow tube as in the first and second embodiments which will advantageously eliminate all the welding operation.

According to the above third and fourth embodiments, a hollow tube is provided at its one end with a yoke press-fitted and. welded therein and at its other end with a spline sliding portion formed by plastically working the end of the hollow tube itself. Therefore, the propeller shaft according to the invention has only one welded portion to improve the production efficiency and hence reduce its cost, comparing with the propeller shaft of the prior art having two welded portions.

Moreover, the hollow tube of the propeller shaft according to the third and fourth embodiments has the integrally formed spline sliding portion so that the spline sliding portion does not include any residual strain therein resulting from welding operation and hence the bending of the shaft caused by welding operation is suppressed to a lesser extent to obtain stability in quality of produced propeller shaft. According to the embodiments, furthermore, the man-hour for working the respective parts is reduced so that the producing cost and weight of the shaft can be reduced.

Figure 14:
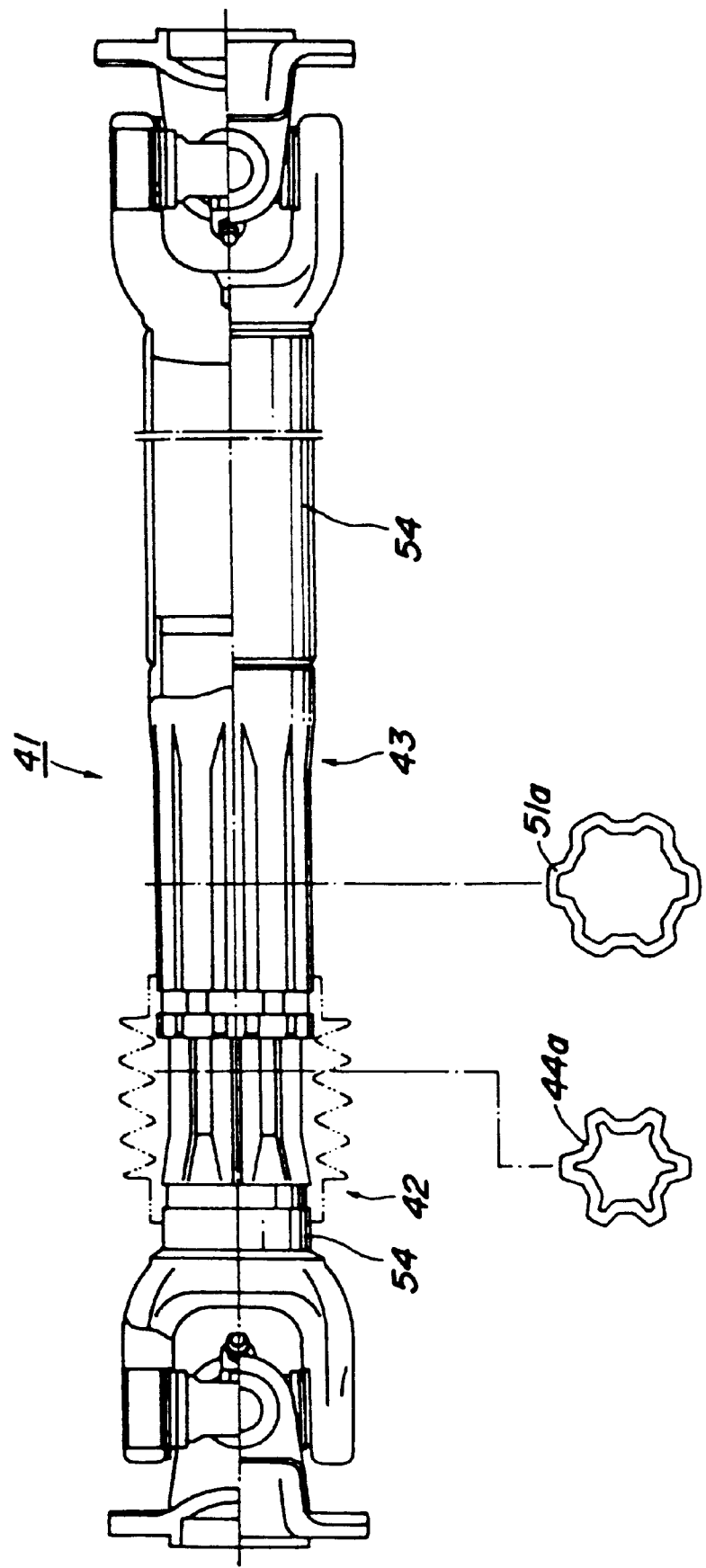
FIG. 14 is a view illustrating a propeller shaft according to a further embodiment of the invention.

FIG. 14 illustrates in a side view a propeller shaft 41 having a male shaft 42 and a female shaft 43 each having a spline sliding portion according to a further embodiment of the invention and additionally illustrates each of their cross-sections. In the embodiment shown in FIG. 14, at least both the spline sliding portions of the male and female shafts 42 and 43 are formed from hollow blank tubes by press-forming with press-dies, respectively. As the case may be, only the female shaft may be formed from a hollow blank tube by press-forming. In consideration of manufacturing cost and environmental protection, however, it is preferable to form both the shafts from hollow blank tubes by press-forming.

Figure 15A:
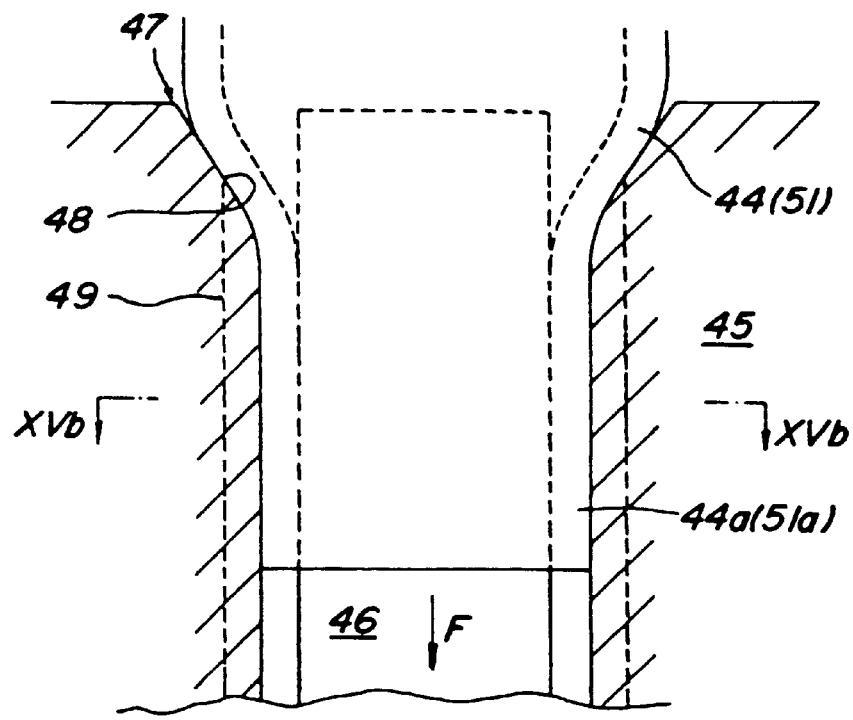
FIG. 15a is a sectional view illustrating the press-forming of a spline sliding portion of a hollow tube inserted into a press-forming die according to the invention.

FIG. 15a illustrates a hollow blank tube for a male shaft, whose at least part corresponding to a spline sliding portion has been inserted into a press-forming die 45 in the direction shown by an arrow F, thereby plastically deforming that part to form the spline sliding portion. A mandrel 46 has previously been arranged at the center of the press-forming die 45.

Figure 15B:
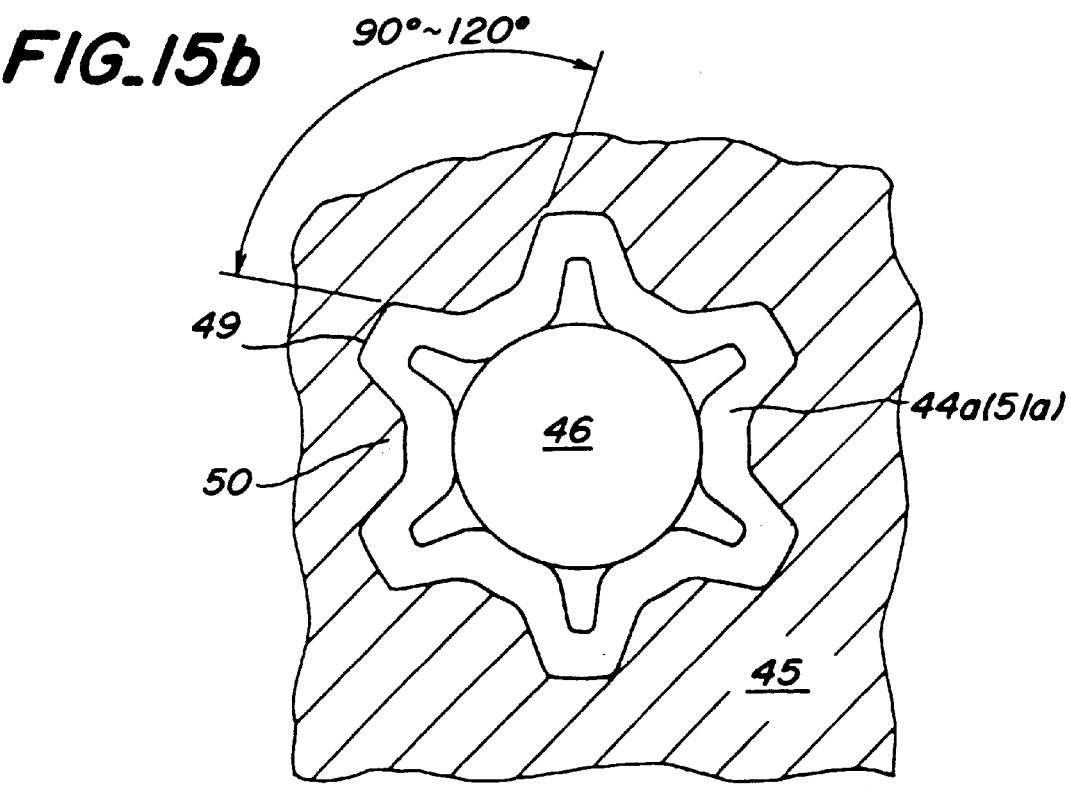

As shown in FIG. 15b, according to this embodiment, the spline sliding portion has the number of spline teeth which is an integer within the range of the numerals obtained by multiplying the numeral indicating the larger spline diameter D in mm by 0.12 to 0.25. The spline teeth viewed in the section of FIG. 15b are spaced circumferentially substantially equidistant one relative to the other, and spline tooth root angles enclosed between side faces of adjacent spline teeth are within the range of 90 to 120 degrees. Therefore, if the larger spline diameter is 50 mm, the number of spline teeth (the number of spaces between teeth) is preferably 6 (six).

The press-forming die 45 for the male shaft has a cavity including an outwardly widened open end 47 having a diameter slightly larger than that of a hollow blank tube 44, a taper portion 48 slightly extending from the open end 47 in the axial direction of the cavity, and a main cavity axially extending over a predetermined length and having inward projections 50 inwardly extending and circumferentially equally spaced. The inward projections 50 extend inwardly of the cavity to form angles 90 to 120 degrees therebetween corresponding to the spline tooth root angles described above and to have a forming profile so as to obtain the number of spline teeth which is an integer within the range of the numerals obtained by multiplying the numeral indicating the larger spline diameter D in mm by 0.12 to 0.25. Before forming operation, a mandrel 46 is arranged at the center of the cavity of the press-forming die 45, the outer diameter of the mandrel 46 corresponding to the inner or smaller diameter of the spline sliding portion 44a to be press-formed.

Preferably, inner faces 49 of the cavity of the press-forming die 45 have a larger diameter slightly smaller than that of the hollow blank tube 44.

The die (not shown) for the female shaft is substantially similar to the press-forming die 45 for the male shaft shown in FIGS. 15a and 15b. However, the die for the female shaft should have the forming profile making it possible to insert the spline sliding portion 44a into the spline sliding portion 51a (FIGS. 16a and 16b) of the female shaft press-formed by the die.

After the spline sliding portion has been thus press-formed, at least whether inner surfaces of the spline sliding portion of the female shaft or outer surfaces of the spline sliding portion of the male shaft are coated with a plastic film 52 as shown by thick solid lines in FIGS. 16a and 16b. FIG. 16a illustrates the plastic film 52 on the inner surfaces of the spline sliding portion 51a of the female shaft, while FIG. 16b illustrates the plastic film 52 on the outer surfaces of the spline sliding portion 44a of the male shaft.

In producing the male and female shafts according to this embodiment of the invention, it is preferable to form spaces 53 between the spline sliding portions 44a and 51a of these shafts, which function as oil reservoirs as shown in FIGS. 16a and 16b. These spline sliding portions 44a and 51a are connected as by welding to the shafts 54 having at their ends yokes secured thereto as shown in FIG. 14.

According to this embodiment of the invention, at least the spline sliding portion of the male or female shaft of a propeller shaft is produced from a hollow tube by press-forming, thereby providing a light-weight propeller shaft and saving the materials for it. Moreover, it becomes possible to form the spline portion in a shortest time to reduce its manufacturing cost considerably. Different from cutting operation in the prior art propeller shaft, the press-forming does not produce any chips so that the operation environment is improved without any environmental contamination or pollution.

Moreover, the propeller shaft according to this embodiment of the invention has spline teeth of an integer which is 0.12 to 0.25 times the numeral indicating the larger diameter D in mm of the spline teeth and whose spline tooth root angle is within the range of 90 to 120 degrees. Therefore, the number of the splines is much fewer than those of the prior art splines and hence the splines of the propeller shaft according to the invention are easily press-formed in conjunction with the advantageous spline tooth root angle.

According to this embodiment of the invention, furthermore, the inward projections 50 of the press-forming die extend inwardly of its cavity with wide angles such as 90 to 120 degrees corresponding to the spline tooth root angles. Therefore, the strength of the die is increased to improve its durability and to prolong its service life. Moreover, spline teeth are spaced circumferentially substantially equidistant one relative to the other so that no unbalance in weight occurs and therefore stability in rotation is improved.

Figure 4A:
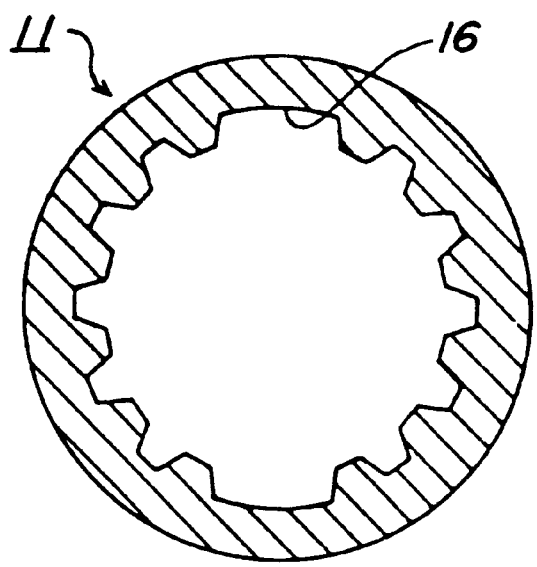
FIG. 4a is a sectional view illustrating a female shaft having an irregular portion as a further example of the phase indexing reference of the prior art.
Figure 4B:
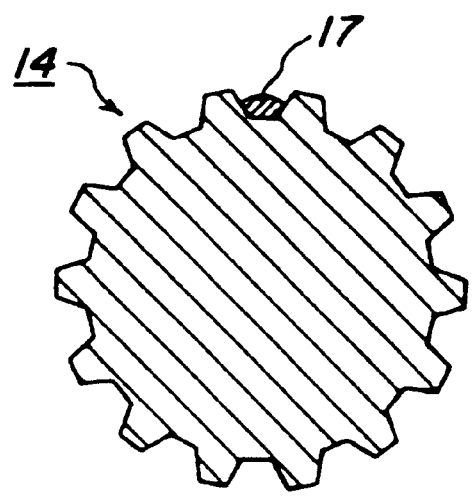
FIG. 4b is a sectional view illustrating a male shaft mating with the female shaft shown in FIG. 4a, having an irregular portion as a phase indexing reference of the prior art.

According to a further embodiment of the invention shown in FIGS. 17a and 17b to 19, a propeller shaft is provided with phase indexing references. In this embodiment, a female shaft 61 is similar to that shown in FIG. 4a to have two diametrically opposed irregular portions 66 at two diametrically opposed teeth of a regular pattern of spline teeth. Only one irregular portion 66 may be provided similarly to that shown in FIG. 3a. The irregular portion 66 has a form in which one spline tooth is removed to connect or merge two bottoms on both sides of the removed tooth into a widened bottom as an irregular portion. These spline teeth of particular pattern are finished by broaching. The "bottom" used herein means a surface positioned at a larger or outer diameter portion between two inwardly extending spline teeth of a female shaft.

On the other hand, spline teeth of a regular pattern of a male shaft 64 is wholly coated with a plastic film 68 somewhat thick as shown in FIG. 17b. The plastic film 68 is then reformed, for example, by broaching into a shape substantially corresponding to the male spline shape except for the plastic film part 69 on the bottom between two adjacent male spline teeth corresponding to the one of irregular portions of the female shaft as shown in FIG. 18b when the male and female shafts coincide in phase with each other. The irregular film part 69 is shown on an enlarged scale in FIG. 19. The irregular film part 69 is shallower than the other bottoms of the spline teeth so that the irregular film part 69 is readily identified in assembling operation of the propeller shaft. The "bottom" used herein means a surface positioned at a smaller or inner diameter portion between two outwardly extending spline teeth of a male shaft.

According to this embodiment of the invention, the irregular portion of the male spline for phase indexing reference can be formed in a simple manner in the finishing step of the series of plastic film coating steps for providing a self-lubricating plastic film, and in addition it is possible to simplify the producing steps of the spline shafts.

While the invention has been particularly shown and described with reference to preferred embodiments thereof, it will be understood by those skilled in the art that the foregoing and other changes in form and details can be made therein without departing from the scope of the claims.

What is claimed is:

1. A propeller shaft comprising male and female shafts, at least one of each male and female shaft is wholly made of a hollow tube, at one end the male and female shafts have an integral yoke, at the other end of the male and female shafts have been worked to form an integral spline sliding portion, the spline sliding portions of said male and female shafts being fitted as plastically worked with each other, and each of said spline sliding portions of said male and female shafts having a largest diameter that is less than the inner diameter of said hollow tube.

2. The propeller shaft as set forth in claim 1, wherein said spline sliding portion of each of said male and female shafts has spline teeth whose number is an integer within the range of numerals obtained by multiplying the numeral indicating a larger spline diameter D in mm by 0.12 to 0.25.

3. The propeller shaft as set forth in claim 2, wherein said spline teeth have a spline tooth root angle within the range of 90 to 120 degrees enclosed between side faces of adjacent spline teeth.

4. The propeller shaft as set forth in claim 1, wherein at least one of said spline sliding portions of said male and female shafts is coated with a plastic film.

5. The propeller shaft of as set forth in claim 1 further comprising a phase indexing reference porion having spline teeth, said phase indexing reference portion including an irregular portion on the female shaft which is equal to the size of one tooth and an irregular portion provided on the male shaft which is formed by a plastic film coating filling in the space between two teeth, and having a form in which one spline tooth is removed to connect two bottoms on both sides of said removed tooth to obtain a widened bottom as said irregular portion, and, said part of the plastic film causing the bottom between two spline teeth to be shallower than the other bottoms of spline teeth on the male shaft, and said part of the plastic film positionally corresponding to said irregular portion of said female shaft when said male and female shafts coincide in phase of spline teeth with each other.

6. A propeller shaft comprising male and female shafts, each male and female shaft is wholly made of a hollow tube, at one end the male and female shafts have a yoke, at the other end the male and female shaft have been worked to form an integral spline sliding portion, the spline sliding portions of said male and female shafts being fitted as plastically worked with each other, and each of said spline sliding portions of said male and female shafts having a largest diameter that is less than the inner diameter of said hollow tube, and the yoke being a separate part press-fitted into one end of the hollow tube and welded thereat.

7. The propeller shaft of as set forth in claim 6 wherein one of said male and female shaft comprises a connecting shaft through which said yoke in secured to said one end of hollow tube.

8. The propeller shaft as set forth in claim 6, wherein said spline sliding portion of each of said male and female shafts has spline teeth whose number is an integer within the range of numerals obtained by multiplying the numeral indicating a larger spline diameter D in mm by 0.12 to 0.25.

9. The propeller shaft as set forth in claim 6, wherein at least one of said spline sliding portions of said male and female shafts is coated with a plastic film.

10. The propeller shaft of as set forth in claim 6 further comprising a phase indexing reference porion having spline teeth, said phase indexing reference portion including an irregular portion on the female shaft which is equal to the size of one tooth and an irregular portion provided on the male shaft which is formed by a plastic film coating filling in the space between two teeth, and having a form in which one spline tooth is removed to connect two bottoms on both sides of said removed tooth to obtain a widened bottom as said irregular portion, and, said part of the plastic film causing the bottom between two spline teeth to be shallower than the other bottoms of spline teeth on the male shaft, and said part of the plastic film positionally corresponding to said irregular portion of said female shaft when said male and female shafts coincide in phase of spline teeth with each other.

* * * * *